Oct. 31, 1950     B. V. FREE     2,527,629

TRAPPING FLOAT

Filed June 1, 1949

Inventor.
Bruce V. Free
By Egerton R. Case
Atty

Patented Oct. 31, 1950

2,527,629

UNITED STATES PATENT OFFICE 2,527,629

TRAPPING FLOAT

Bruce Victor Free, Kingston, Ontario, Canada

Application June 1, 1949, Serial No. 96,441
In Canada May 18, 1948

1 Claim. (Cl. 43—96)

This invention relates to a trapping float and the objects of the invention are: (1) to provide a trapping float, the angular position of which with relation to the level of the water will be controlled by the volume of a confined body of air below the float, (2) to provide means to vary the buoyancy of the float to determine its floating position in the water, without removing it therefrom, and (3) to anchor the float in the water so that it will ride the waves and rise and fall according to the level of the water.

The float consists of two portions or parts of different buoyancy made from suitable wood, such as cedar. Carried by and below the float is an air-chamber open at its lower end to receive water as the float is placed therein and trap the contained air thereby providing additional buoyancy for the float. At the higher end of the float is a single vertical means to anchor the float in place and yet allow it to freely rise and fall in the water.

In the drawings like characters of reference refer to the same parts.

Figure 1:
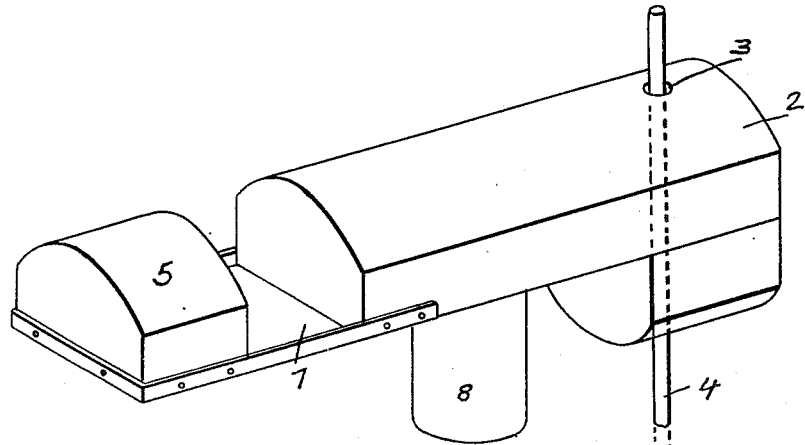
Fig. 1 is a perspective view of the float.
Figure 3:
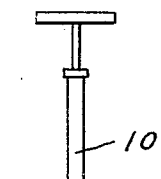
Fig. 3 is a side elevation of the air-pump that may be used to regulate the volume of air within the air-chamber.

The preferred form of the float consists of a major portion 2, thicker at one end than at the other and through which thicker end is made a vertical hole 3, through which a stake 4, of smaller diameter, is passed to anchor the float in place. The minor portion 5, of the float is also made of wood, and is longitudinally spaced apart from the major portion 2.

To support the trap 6, is a tray 7, preferably made of galvanized metal. This tray may be made in any suitable form and is suitably secured to the bottom side of the portions 2 and 5, so that the trap 6, in use will be always covered with water.

Carried by and beneath the float, preferably beneath the major portion 2, is an air chamber 8, consisting preferably of a metal can open at its lower end. When the float is placed in the water, air will be trapped in the can and will add to the buoyancy produced by the portions 2 and 5.

The trap 6, is designed to lie submerged in the water below the upper sides of the portions 2 and 5, and above the bottom 1.1 of the stream and is thus well hidden.

Figure 2:
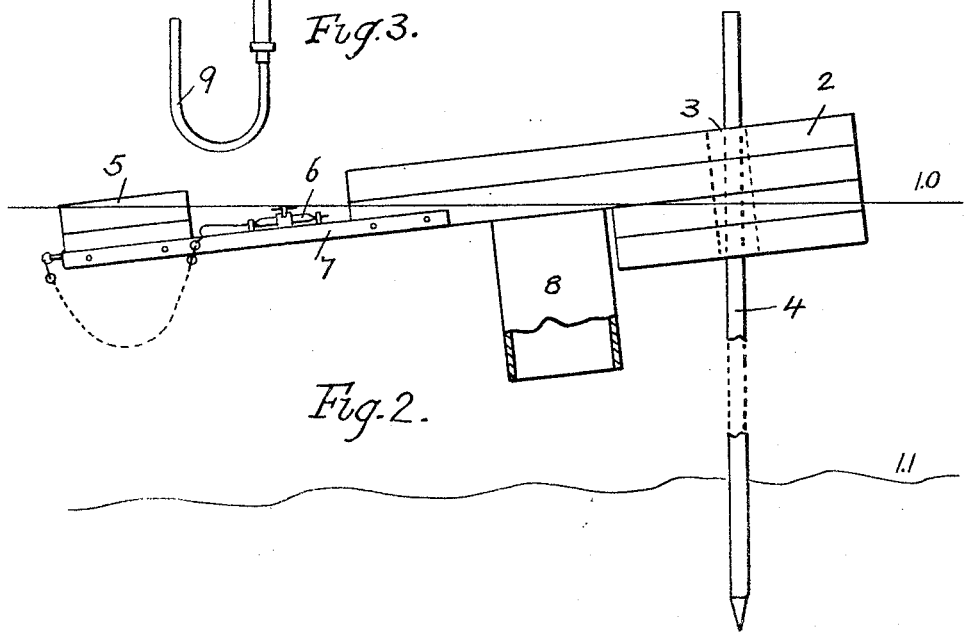
Fig. 2 is a side elevation of the float.

As will be seen particularly from Fig. 2, the float, in use, occupies an inclined position to the vertical thus facilitating the climbing of a swimming animal onto the major portion 2, over the minor portion 5, and the trap 6.

The float must be free to rise and fall with the surface of the water level 1.0, and hence the anchoring means, such as the stake 4, must not interfere with this vertical movement.

If the float rides too high, the curved tube 9, of the air pump 10, is passed through the open end of can 8, and surplus air pumped therefrom, sufficiently to cause the float to ride as desired.

Any number of the air chambers may, of course, be used.

While herein has been described the preferred embodiment of this invention it must be understood that various changes in construction may be made without departing from the spirit of the invention and the scope of the claim.

I claim:

A trapping float comprising wooden portions of different buoyancy, longitudinally spaced apart; a tray for a trap coupling said portions together, and an air-chamber secured to the bottom of one of the wooden portions and open at its lower end depending below the float and adapted to receive water as the trap is placed therein and trap the contained air thereby providing additional buoyancy for the float.

BRUCE VICTOR FREE.

REFERENCES CITED

The following references are of record in the file of this patent:

UNITED STATES PATENTS

| Number | Name | Date |
|---|---|---|
| 1,908,714 | Schneider | May 16, 1933 |
| 1,970,672 | Prestenback | Aug. 21, 1934 |
| 2,133,721 | Seidman | Oct. 18, 1938 |